United States Patent
Halbert et al.

Patent Number: 6,036,796
Date of Patent: Mar. 14, 2000

[54] CLOSED-LOOP ULTRASONIC WELDING METHOD AND APPARATUS

[75] Inventors: Robert C. Halbert, Danbury; Sylvio J. Mainolfi, Roxbury, both of Conn.

[73] Assignee: Branson Electronics, Danbury, Conn.

[21] Appl. No.: 09/105,820

[22] Filed: Jun. 26, 1998

[51] Int. Cl.[7] .................................................. B32B 31/20

[52] U.S. Cl. ................... 156/64; 156/73.1; 156/580.1; 156/580.2; 156/351; 156/378; 156/379

[58] Field of Search ........................ 156/73.1, 580.1, 156/580.2, 64, 378, 379, 351

[56] References Cited

U.S. PATENT DOCUMENTS

| | | | |
|---|---|---|---|
| 5,658,408 | 8/1997 | Frantz | 156/64 |
| 5,749,987 | 5/1998 | Wannebo | 156/64 |

Primary Examiner—Richard Crispino
Assistant Examiner—George R. Koch, III
Attorney, Agent, or Firm—Polster, Lieder, Woodruff & Lucchesi

[57] ABSTRACT

A closed-loop ultrasonic welding apparatus for sealing or welding thermoplastic material on a continuous basis wherein the material to be welded is fed through a weld station comprising a horn and anvil. The apparatus includes means for providing a first signal commensurate with a desired ultrasonic energy density in the material when welded, a second signal responsive to the feed speed of the material through the weld station, and a third signal commensurate with the power coupled by a power supply via a transducer and the horn to the material at the weld station. Control means receive the first, second and third signals and produce an error signal, which is responsive to the difference between the desired energy density and the actual energy density coupled to the material. After being subjected to further processing the error signal is converted to a control signal for controlling the output from said power supply and/or controlling the engagement force between the horn and material. Hence, the welding apparatus causes a predetermined energy density in the welded material irrespective of disturbances or changes in feed speed, engagement force between the horn and material, or the material itself.

17 Claims, 3 Drawing Sheets

CLOSED-LOOP ULTRASONIC WELDING METHOD AND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFILM APPENDIX

Not Applicable

BACKGROUND OF THE INVENTION

This invention relates to ultrasonic welding methods and apparatus and, more particularly, concerns an ultrasonic welding method and apparatus for thermoplastic film and fabric material which is welded on a continuous basis by being fed through a weld station formed by a resonant horn and an oppositely disposed anvil, usually a cylindrical roller. As a result of the dissipation of ultrasonic energy coupled by the horn to the material, welding of the material occurs. For instance, two or more sheets of thermoplastic material can be joined or seamed together. Ultrasonic apparatus of this type are well established, see for instance, U.S. Pat. No. 3,733,238 issued to D. D. Long et al., May 15, 1973, "Apparatus for Vibratory Welding of Sheet Material".

The present invention, quite specifically, concerns a closed-loop continuous feed welding method and apparatus in which the ultrasonic energy density coupled to the material is preselected and is maintained constant at that level despite variations in feed speed, weld force or variations and inconsistencies of the material. The closed-loop system, as will be shown hereafter, includes means for developing a feed-back signal which is applied to a feedback controlled electrical power supply, or to a force means controlling the engagement force between the horn and the material, or to both, for maintaining the ultrasonic energy density at a preset level by sensing the feed speed and the power provided to the resonant horn, and processing in a control circuit, which receives a preset ultrasonic energy density signal, signals commensurate with both these operating parameters.

Controlling in an ultrasonic apparatus the ultrasonic power coupled to a workpiece as a function of feed speed is not entirely new as seen, for instance, in U.S. Pat. No. 3,666,599 issued to E. G. Obeda, dated May 30, 1972, entitled "Sonic or Ultra-sonic Seaming Apparatus". This patent discloses an ultrasonic seaming or welding apparatus in which the power provided from the ultrasonic power supply is varied as a function of material feed speed by using for power control a rheostat which is coupled to a foot operated speed control. However, this patent represents an open-loop system in which the speed versus ultrasonic power from the power supply is empirically established and is not altered for different materials, for changes in engagement force, or for variations present in a roll of material. These short-comings are overcome by the closed-loop welding method and apparatus disclosed herein.

BRIEF SUMMARY OF THE INVENTION

The closed-loop feedback controlled ultrasonic welding method and apparatus per this invention includes an electrical power supply which provides high frequency electrical power at a predetermined ultrasonic frequency to an electroacoustic transducer. The resulting mechanical vibrations from the transducer are coupled via an optional coupling horn, also known as booster horn, to the input surface of a horn, which like the transducer and the coupling horn is dimensioned to be mechanically resonant at the predetermined frequency. The opposite end of the horn, forming the output surface, together with an oppositely disposed anvil form a gap or nip (weld station) through which material to be welded is fed along a linear path. Force means effective upon the horn or upon the anvil urge the material and the horn's output surface into intimate engagement with one another, whereby the dissipation of the ultrasonic energy provided by the horn to the material causes the material to soften and subsequently to solidify as the material leaves the weld station, thus causing a weld. Control means of the apparatus receive a signal commensurate with a predetermined ultrasonic energy density to be provided to the material, a signal responsive to the feed speed of the material through the weld station and a signal responsive to the ultrasonic power provided by the power supply to the transducer, and produce in response to the received signals an output signal or signals for controlling the power supply, or a force means providing the engagement force between the horn and material, or both, for causing the ultrasonic power coupled to the material to be commensurate with the predetermined energy density. Thus, a highly stable ultrasonic welding process is achieved which greatly improves the quality of the welded product as the apparatus provides compensation for changes occurring during the welding process. Because different materials and thicknesses require different ultrasonic energy densities, such changes are readily made and the desired energy density value is maintained constant through-out a particular run.

One of the principal objects of this invention, therefore, is the provision of a new and improved ultrasonic welding method and apparatus for welding thermoplastic film and fabric material.

Another major object of this invention is the provision of an improved ultrasonic welding method and apparatus for welding thermoplastic film and fabric material on a continuous basis and maintaining the ultrasonic energy density coupled to the material constant at a preset level despite changes in the material, feed speed or ultrasonic energy level.

Another important object of this invention is the provision of an ultrasonic welding apparatus, particularly suited for welding thermoplastic film and fabric material on a continuous basis, which includes control means for providing a feedback controlled closed-loop, thus causing a feedback signal to an ultrasonic power supply and/or a weld force controller for providing weld power commensurate with a preset ultrasonic energy density in the material processed.

A further important object of this invention is the provision of a feedback controlled closed-loop ultrasonic welding method and apparatus for achieving improved welding of film and fabric material by compensating for variations and inconsistencies arising during the welding process.

Another and further object of this invention is the provision of an ultrasonic welding method and apparatus for welding thermoplastic film and fabric material and providing welds that are characterized by a high degree of consistency and improved quality.

Further and still other important objects of the present invention will become more clearly apparent from the following specification when read in conjunction with the accompanying drawings.

DETAILED DESCRIPTION OF THE INVENTION

Welding and sealing of thermoplastic material by ultrasonic vibrations is an established process as indicated heretofore and is used for joining sheet material which can be either in the form of film material or woven or non-woven fabrics. For woven or non-woven material a thermoplastic content of at least fifty percent is generally desired to assure adequate welding. The advantages of ultrasonic sealing over conventional sewing methods are the elimination of consumable materials, such as thread and needles. Also, because of fewer moving parts, ultrasonic welding is more reliable and requires less maintenance than conventional sewing machines. A continuous sealing process, moreover, can be used to produce a hermetic seal.

Figure 1:
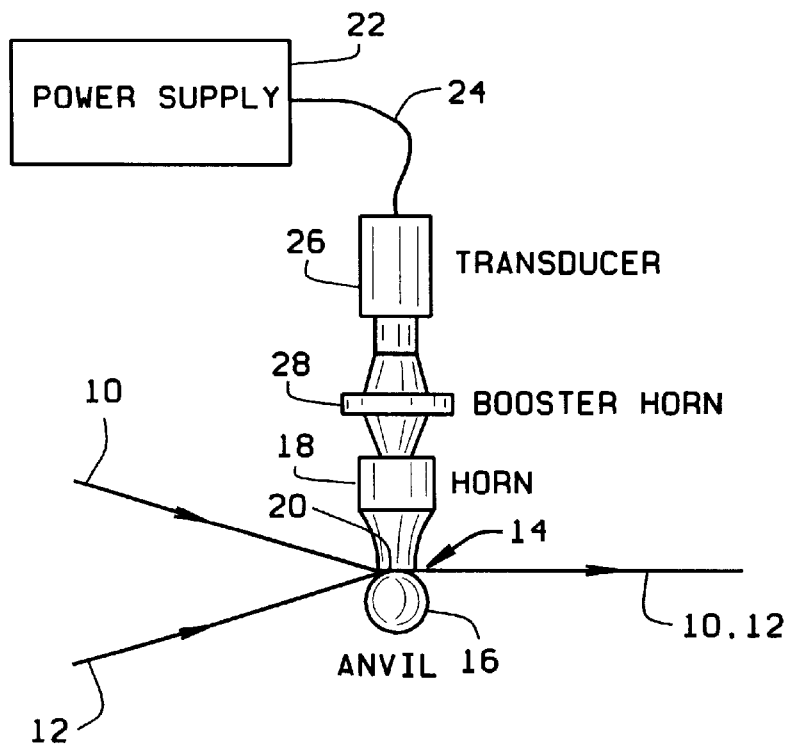
FIG. 1 is a schematic illustration of a typical ultrasonic welding apparatus for welding thermoplastic film and fabric material on a continuous basis.

Referring now to the figures and FIG. 1 in particular, there is shown a typical ultrasonic welding apparatus in which two thermoplastic sheets 10 and 12, superposed upon one another, are fed through an ultrasonic weld station 14 comprising an anvil 16 and an oppositely disposed resonant horn 18. The frontal surface 20 of the horn 18 and the anvil 16 are urged toward mutual engagement by force means, not shown, but indicated by arrow 17 in FIG. 2, for causing the horn to be in forced contact with the sheet material for coupling the ultrasonic vibrations to the material, whereby to effect welding. The anvil 16, most suitably, is a rotating cylinder which may have a raised pattern along its periphery to weld the sheets together in a pattern, see D. D. Long et al. or E. Obeda, supra. The horn is energized from a power supply 22 which provides electrical high frequency power at a predetermined ultrasonic frequency via a cable 24 to an electroacoustic transducer 26 which, in turn, provides mechanical vibrations at that frequency to a booster or coupling horn 28 coupling these vibrations to the horn 18. The horns 18 and 28 and the transducer 26 are dimensioned to be mechanically resonant longitudinally at the predetermined frequency. The above stated combination of components forming a welding apparatus is well known to those skilled in the art.

In an ultrasonic welding process using an apparatus as shown above, the feed speed (pull-through speed) generally is fixed and determined by production requirements. The motional amplitude of the horn 18 is manually adjusted by control means at the power supply 22 for achieving optimal welding of the sheets at the given feed speed. Factors which affect weld quality are: speed, engagement force, type of material, thickness of material and horn amplitude. If all of these parameters are held constant during the welding, consistent welding occurs. However, a major problem with the known system arises when a variable parameter changes, such as feed speed or applied force, in which case over-welding or under-welding of a workpiece may take place. No feedback system is present to link all of these variables together for consistent and reliable welding. The present invention creates a closed-loop system which links the weld's energy level and feed speed.

Figure 2:
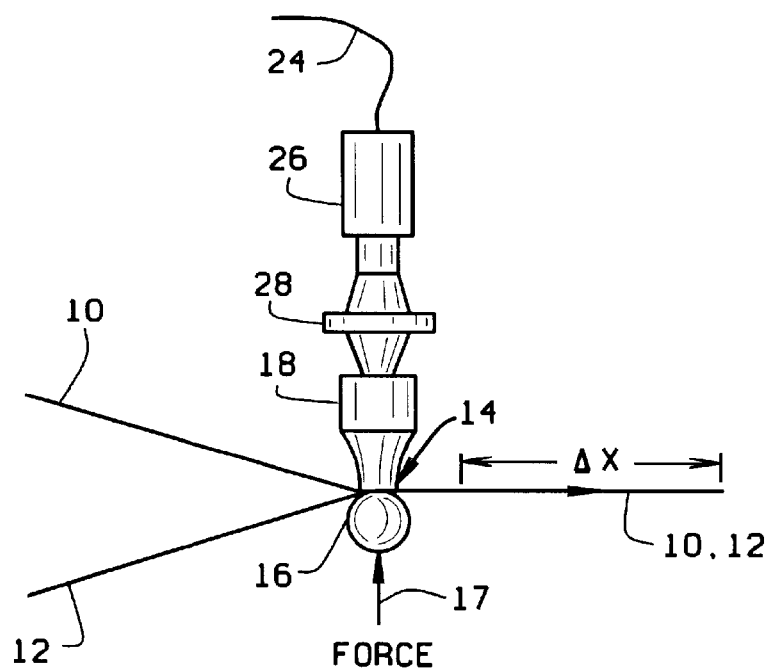
FIG. 2 is a schematic illustration similar to FIG. 1.

Referring now to FIG. 2, two thermoplastic sheets 10 and 12 are being fed through the weld station 14. The horn 18 is applying a force, arrow 17, upon the anvil 16 so that energy is created, thereby melting the sheet material at the weld station and causing a weld as the sheet material exits from the weld station and cools.

If the sheets are continuously pulled through and a length $\Delta X$ was sealed, then an energy $\Delta E$ was produced to seal the two sheets together. The energy is calculated from the amount of power produced by the power supply integrated over the time the length $\Delta X$ was being sealed. The average linear energy density Uavg, sealing the length $\Delta X$ is:

$$\text{Uavg} = \Delta E / \Delta X \qquad \text{Equation 1.}$$

The energy density is a quantitative measure of the weld produced and is represented as a ratio of energy per unit distance. The energy density Uavg is a function of speed, amplitude, force and material properties.

$$\text{Uavg} = f(v, a, k, f) \qquad \text{Equation 2.}$$

v=feed speed
a=horn face motional amplitude
k=material properties
f=applied force Every sealing system has an optimal energy density for the best quality weld. The energy density for each system has to be determined experimentally by varying one variable and holding the others constant. For example, if speed, force and material properties are fixed, then the amplitude value would need to be adjusted to increase or decrease the energy density. If the energy density were too high, the seal would be over-welded. If the energy density were too low, the seal would be under-welded. Therefore, weld quality is sensitive to external disturbances which is a problem with current open-loop ultrasonic sealing systems.

If the material properties are constant across the sheets, which is an appropriate assumption since the sheets are homogenous to small lengths, the energy density across the sheets will be constant for a given force, speed, and amplitude, and the value Uavg will have no deviations within the sealing of the sheets. Given this assumption, Equation 1 can be rewritten as:

$$\text{Uavg} = U(t) = \Delta E / \Delta X = \text{CONSTANT.}$$

At the differential limit:

$$\frac{\Delta E}{\Delta X} \xrightarrow{\Delta X \to 0} \frac{dE}{dX}. \qquad \text{Equation 3}$$

Equation 3 states that for homogenous thermoplastic sheets, the energy density U(t) is equal to an infinitesimal amount of energy applied over an infinitesimal length, and if all variables are held constant, this ratio is constant across the entire length of the sheets.

The energy and distance differentials of Equation 3 can be rewritten as:

$$dE = P(t) \cdot dt \text{ and } dX = v(t) \cdot dt \qquad \text{Equation 4.}$$

P(t) is the real time measurement of the amount of power being produced by the power supply and v(t) is the real time feed speed of the sheets.

Substituting Equation 4 into Equation 3:

$$U(t) = P(t)/v(t) \text{ v } P(t) = U(t) \cdot v(t) \qquad \text{Equation 5.}$$

Equation 5 says that the energy density is the real time ratio of output power to the feed speed.

If a feed speed is measured, then the energy density can be controlled by adjusting the output power. Since speed can easily be measured and controlled, a closed-loop system can be designed to control the output power for a fixed energy density.

Figure 3:
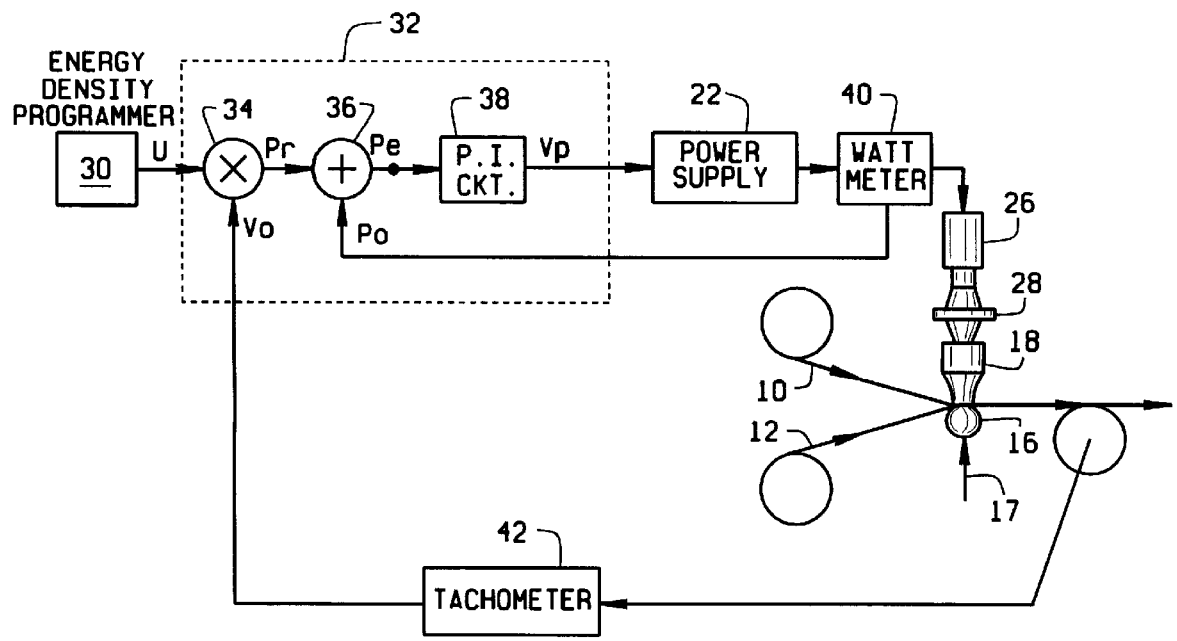
FIG. 3 is a schematic illustration of an ultrasonic welding apparatus per the present invention, showing control means for providing a closed-loop arrangement.

Referring now to FIG. 3, a block diagram of a closed-loop ultrasonic welding apparatus is shown. In addition to the components shown in FIG. 1, there is provided also an ultrasonic energy density programmer 30, a control means 32 comprising a multiplier 34, a summing means 36 and a proportional-integration circuit 38. Additionally, there is a wattmeter 40 coupled in circuit from the power supply 22 to the transducer 26, also known as converter, and a tachometer 42 coupled for providing a signal responsive to the feed speed of the sheets through the weld station. The ultrasonic power supply may be of the type shown in U.S. Pat. No. 4,973,876 issued to A. J. Roberts, dated Nov. 27, 1990, entitled "Ultrasonic Power Supply". The power supply includes means for controlling the output voltage which, in turn, affects the motional amplitude of the horn and, hence, the power coupled by the horn to the sheet material being welded.

The energy density programmer 30, in a typical embodiment, produces an adjustable zero to ten volt d.c. analog signal U proportional to the energy density desired. If a material is known to seal best at a given density, the operator will enter that level into the programmer. The programmer then provides an analog output voltage proportional to the entered energy density level. For example, if two thermoplastic films require 120 Joules per meter (120 J/m) for best sealing, the operator enters "120" into the programming means 30 and the energy density programming means will produce a corresponding analog signal of 1.20 VDC.

The multiplier means 34 of the control means 32 multiplies the analog voltage signal U from the energy density programming means 30 by the analog voltage signal Vo from the tachometer 42. The tachometer measures the feed speed of the sheets through the weld station. The multiplication product signal Pr=U·Vo is the required output level from the power supply, given an energy density level and a feed speed. For example, assuming that a material requires an energy density of 120 J/m and a feed speed of 100 m/min, the energy density level would be set for 120 J/m and the output signal U would be 1.20 VDC. The tachometer 42 converts the feed speed to an analog voltage proportional to the speed in meters per second. At 100 m/min the rate in meters per second is 1.667, causing the output voltage Vo of the tachometer to be 1.67 VDC. The product of the values U and Vo, in this example, is 1.20×1.67=2.00. Hence, the required output power from the power supply 22 is 2.00 VDC or 200 W.

The summing means 36 is provided to subtract the signal Po from the wattmeter 40, measuring the output from the power supply 22, from the calculated and required power level signal Pr. The signal Po is a 0 to 10 VDC analog signal from the power meter, and is proportional to the actual output power in watts. For example, if the power supply 22 was producing 300 W of power, the output of the power meter would be 3.00 V. The difference between the signals Pr and Po is the loop error Pe. Since this is a closed-loop system, the loop error Pe is minimized. For example, if the required power level Pr is 2.00 V and the actual power from the power supply Po is 1.97 V, the loop error would be 0.03 V. The actual error in watts would be 3 W.

Figure 4:
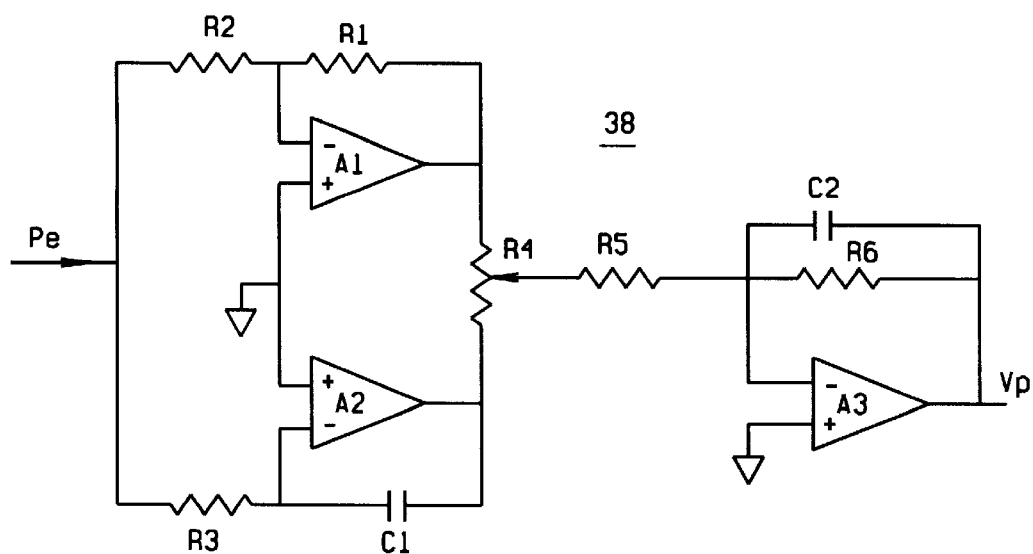
FIG. 4 is a schematic electrical circuit diagram of one of the circuits shown in block form in FIG. 3.

FIG. 4 is an electrical circuit diagram of the proportional-integration circuit. This circuit multiplies the error signal Pe from the summing means 36 with a high gain value K. The product K·Pe is added back to the error integrated term. The error integration term is $H \cdot \int Pe \cdot dt$. The proportional gain term K·Pe is for creating high loop gain to minimize error. The integration term $H \cdot \int Pe \cdot dt$ is to reduce steady-state error or proportional droop. The circuit operates as follows: The error output signal Pe is multiplied by a high negative gain value K created by amplifier A1 and resistors R1 and R2. The output of amplifier A1 is a negative analog voltage equal to Pe·(R1/R2). The error output signal Pe is also integrated over time and multiplied by a negative gain value H produced by amplifier A2 and components R3 and C1. The output of amplifier A2 is a negative analog voltage signal equal to $[1/(R3 \cdot C1)] \cdot (\int Pe \cdot dt)$. The outputs of the amplifiers A1 and A2 are weight added through potentiometer R4. Amplifier A3 and components R5, R6 and C2 buffer and reverse the sign of amplifiers A1 and A2 weighted value. The output of amplifier A3 is an analog voltage Vp. Resistor R6 and capacitor C2 form a dominant pole filter for system stability.

As described in connection with FIG. 1, the power supply 22 produces a high frequency output voltage at the predetermined ultrasonic frequency which drives the piezoelectric transducer 26. Responsive to the applied voltage, the transducer is rendered resonant along its longitudinal axis, creating the vibrations necessary to weld the sheets 10 and 12. The analog voltage Vp from the proportional-integration circuit 38 controls the amplitude of the voltage produced by the power supply and fed to the transducer. The amplitude of the vibrations produced by the transducer 26 is proportional to the voltage Vp. For example, if the value of the voltage Vp is 6.5 VDC, the amplitude of the vibrations of the transducer would be 65.0%. Since the ultrasonic power is a function of the vibrational amplitude of the transducer, controlling the amplitude of the vibrations at the transducer will control the ultrasonic power. The coupling or booster horn 28 provides additional mechanical amplification of the vibrations. Horns with different amplification factors are commercially available and are selected to suit a particular application. The horn 18 couples the ultrasonic energy to the sheets to be sealed, and the compressive force applied across the horn 18 and anvil 16 creates the power necessary to effect sealing at the weld station 14.

In a closed-loop ultrasonic welding system per FIG. 3, the error signal Pe, after being processed in the proportional-integration circuit, is applied as a control signal Vp to the power supply 22 for controlling the amplitude of the output voltage reaching the piezoelectric transducer 26. If the anvil 16 is rigidly mounted and the horn 18 engages the workpiece at a preset and substantially constant force, the power coupled by the horn to a workpiece will be a function of the motional amplitude present at the output surface of the horn.

Figure 5:
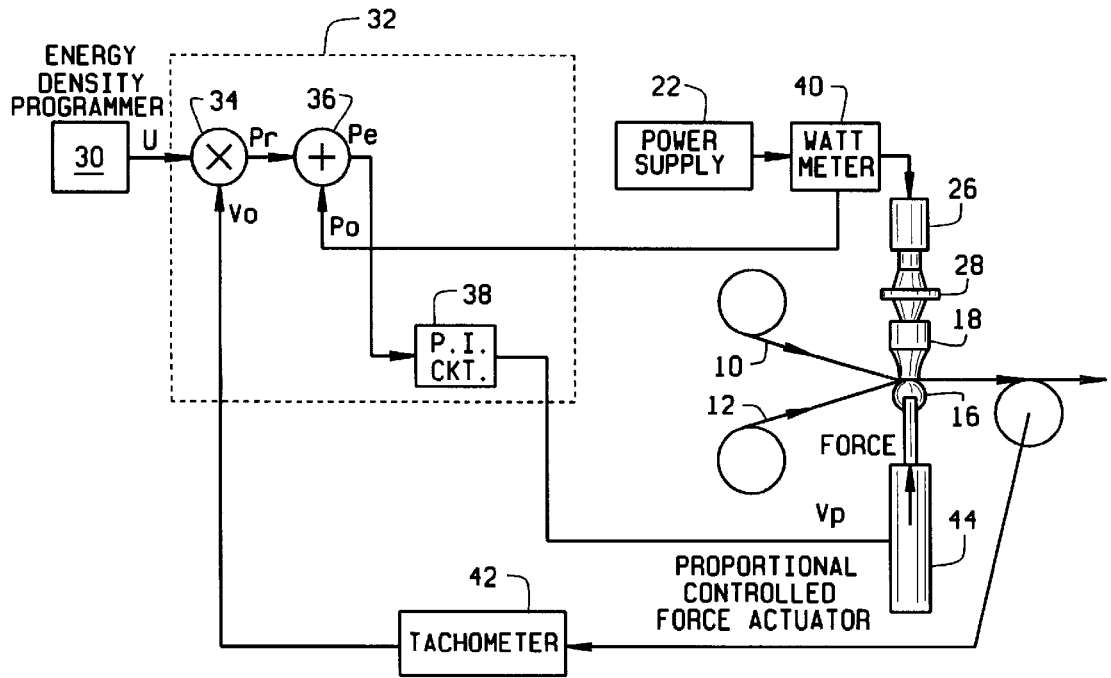
FIG. 5 is a schematic illustration of an alternative embodiment of the ultrasonic welding apparatus shown in FIG. 3.

As has been stated previously, the welding power can be adjusted also by controlling the engagement force between the horn and workpiece. Such an alternative embodiment is seen in FIG. 5 wherein the anvil 16 is coupled mechanically to a proportional controlled force actuator 44. In this embodiment, the voltage signal Vp from the proportional-integration circuit, instead of being coupled as a feedback signal to the power supply 22, is fed to the actuator 44. The actuator provides a force directly proportional to the applied voltage, thus controlling the force with which the horn 18 engages the material to be sealed at the weld station. For example, if the signal Vp has a value of 3.5 V, a force of 350 Newtons will be provided by the actuator 44.

Figure 6:
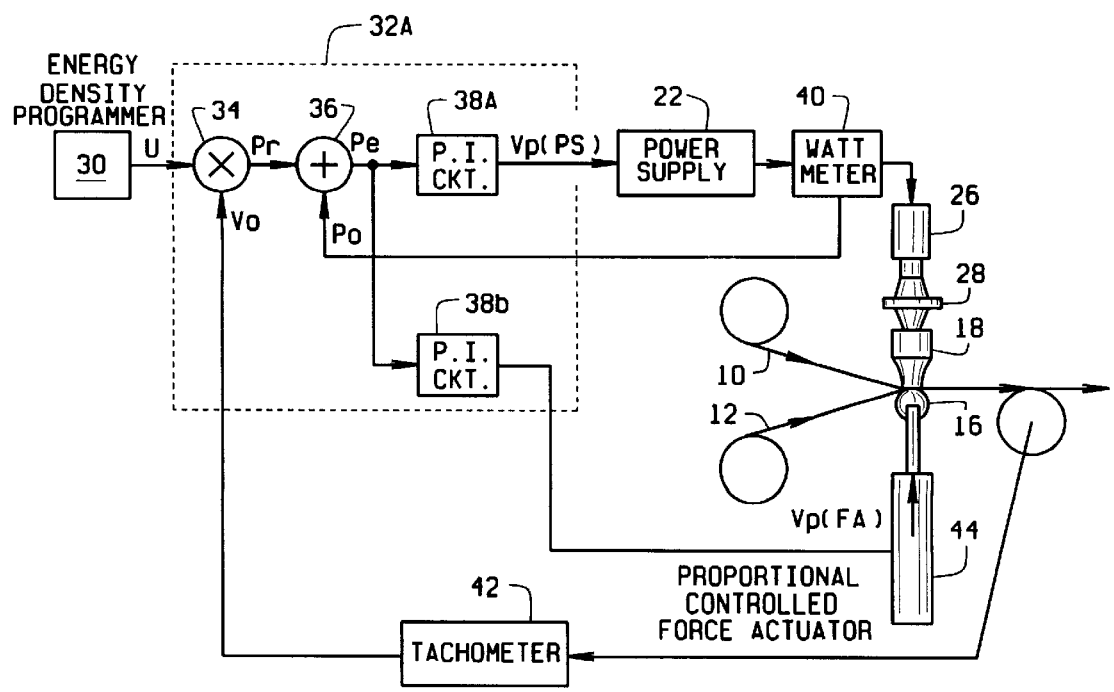
FIG. 6 is a schematic illustration of a further alternative embodiment of the ultrasonic welding apparatus per the present invention.

A further alternative embodiment of the invention is shown in FIG. 6. The error signal from the summing means 36 is branched and is fed to two proportional-integration circuits 38A and 38B of the control means 32A. The circuit 38A provides an output voltage Vp(PS) which is fed to the power supply 22, and the proportional-integration circuit 38B, which may or may not be independent of the circuit 38A, provides its output voltage signal Vp(FA) to the force actuator 44. In this embodiment, both the motional amplitude of the horn as well as the engagement force between the horn and the material are controlled. The signals Vp(PS) and Vp(FA) may or may not have equal value.

In a still further embodiment, not illustrated, instead of controlling the workpiece engagement force at the anvil, it is readily possible to control the engagement force by controlling the force effective upon the assembly comprising the transducer, coupling horn and horn. This assembly, in most commercially available ultrasonic welding apparatus, is mounted for reciprocating motion responsive to fluid pressure. By controlling this pressure, the force exerted by the horn upon the workpiece can be changed and thereby controlled in the same manner as when controlling the force exerted by the anvil responsive to the force actuator 44.

It will be appreciated that the closed-loop ultrasonic welding method and apparatus disclosed herein will provide improved welding of thermoplastic film and fabric material and will produce consistent and predictable results.

While there have been described and illustrated several preferred embodiments of the invention, it will be apparent to those skilled in the art that various further changes and modifications may be made without departing from the broad principle of this invention, which shall be limited only by the scope of the appended claims.

We claim:

1. The method of ultrasonically welding thermoplastic sheet material comprising:

feeding the material to be welded through a weld station comprising an anvil and an oppositely disposed horn rendered resonant at an ultrasonic frequency for coupling ultrasonic energy into the material as the material is fed through said station between said horn and anvil, and providing a force for urging said anvil and horn toward mutual engagement for causing said horn to be in forced engagement with the material;

providing a first signal commensurate with a predetermined energy density to be present in the material when welded at said station, a second signal responsive to the feed speed of the material through said station, and a third signal responsive to the ultrasonic power coupled by said horn to the material;

processing said first, second and third signals by multiplying said first signal by said second signal to cause a multiplication product signal; subtracting said third signal from said multiplication product signal to produce an error signal, and processing said error signal in a proportional-integration circuit for minimizing the loop and steady-state errors of said error signal, whereby to obtain a control signal; and using said control signal for controlling the ultrasonic power coupled by said horn to the material for causing the energy density in the material to be commensurate with said first signal.

2. The method of ultrasonically welding thermoplastic sheet material as set forth in claim 1, said first signal being adjustable.

3. The method of ultrasonically welding thermoplastic sheet material as set forth in claim 1, said first, second and third signals, said error signal and said control signal comprising analog electrical signals.

4. The method of ultrasonically welding thermoplastic sheet material as set forth in claim 1, the material fed through said weld station comprising a plurality of superposed thermoplastic sheets.

5. The method of ultrasonically welding thermoplastic sheet material as set forth in claim 1, and feeding said control signal to an ultrasonic power supply for controlling the output of said power supply which provides power to a transducer to which said horn is mechanically coupled.

6. The method of ultrasonically welding thermoplastic sheet material as set forth in claim 1, and using said control signal to control the force urging the mutual engagement between said anvil and said horn.

7. The method of ultrasonically welding thermoplastic sheet material as set forth in claim 1, and feeding said control signal to a force actuator coupled to said anvil for controlling the mutual engagement force between said anvil and said horn and thereby the engagement force between said horn and material.

8. The method of ultrasonically welding thermoplastic sheet material as set forth in claim 1, and branching said error signal for providing two control signals from said error signal; feeding one of said control signals to an ultrasonic power supply for controlling the output of said power supply which provides power to a transducer to which said horn is mechanically coupled, and using the other control signal for controlling the force urging the mutual engagement between said horn and said anvil.

9. A closed-loop ultrasonic welding apparatus for welding thermoplastic material comprising:

a weld station including an anvil and an oppositely disposed horn adapted to be rendered resonant at a predetermined ultrasonic frequency for coupling ultrasonic energy to material fed through said station between said anvil and horn and thereby effect welding of the material;

force means disposed for urging said anvil and horn into mutual engagement whereby causing said horn to be in forced engagement with the material at said station;

a power supply for supplying electrical power at said frequency;

a transducer mechanically coupled to said horn and electrically coupled to said power supply for receiving from said power supply electrical energy and in response thereto rendering said horn resonant at said frequency;

means for providing a first signal commensurate with a predetermined energy density to be present in the material welded at said station, a second signal responsive to the feed speed of the material through said station, and a third signal commensurate with the ultrasonic power coupled by said horn to the material at said station;

control means including multiplying and adding means coupled for multiplying said first signal by said second signal to produce a multiplication product signal and subtracting said third signal from said multiplication product signal, thereby producing an error signal, and a proportional-integration circuit for receiving said error signal and minimizing the loop error and steady-state error of said error signal, thereby providing a control signal; and said control signal being coupled as a feedback signal for causing said power coupled by said horn to the material to be commensurate with said predetermined energy density.

10. A closed-loop ultrasonic welding apparatus for thermoplastic material as set forth in claim 9, said first signal being adjustable.

11. A closed-loop ultrasonic welding apparatus for thermoplastic material as set forth in claim 10, said means for providing said second signal comprising a tachometer producing an electrical signal, and said means for providing said third signal comprising a wattmeter coupled in circuit between said power supply and said transducer.

12. A closed-loop ultrasonic welding apparatus for thermoplastic material as set forth in claim 9, said control signal being fed to said power supply for controlling the power supplied to said transducer.

13. A closed-loop ultrasonic welding apparatus for thermoplastic material as set forth in claim 9, said control signal being fed to said force means for controlling the engagement force between said horn and the material.

14. A closed-loop ultrasonic welding apparatus for thermoplastic material as set forth in claim 13, said force means comprising a force actuator coupled to said anvil, and the force provided by said actuator being responsive to said control signal.

15. A closed-loop ultrasonic welding apparatus for thermoplastic material as set forth in claim 9, said control signal being branched into two portions, one being coupled to said power supply for controlling the power supplied therefrom, and the other being coupled to said force means for controlling the engagement between said anvil and horn.

16. A closed-loop ultrasonic welding apparatus for thermoplastic material as set forth in claim 9, said first, second and third signals, and said control signal comprise analog direct current voltage signals.

17. A closed-loop ultrasonic welding apparatus for welding thermoplastic material comprising:

a weld station including an anvil and an oppositely disposed horn adapted to be rendered resonant at a predetermined ultrasonic frequency for coupling ultrasonic energy to material fed through said station between said anvil and horn and thereby effect welding of the material;

force means disposed for urging said anvil and horn into mutual engagement with the material at said station;

a power supply for supplying electrical power at said frequency;

a transducer mechanically coupled to said horn and electrically coupled to said power supply for receiving from said power supply electrical energy and in response thereto rendering said horn resonant at said frequency;

means for providing a first signal commensurate with a predetermined energy density to be present in the material welded at said station, a second signal responsive to the feed speed of the material through said station, and a third signal commensurate with the ultrasonic power coupled by said horn to the material at said station, and control means including multiplying means coupled for multiplying said first signal by said second signal for producing a multiplication product signal, adding means coupled for subtracting said third signal from said multiplication product signal for producing an error signal; a pair of proportional-integration circuits, each of said circuits coupled for receiving said error signal and processing the received error signal to minimize its loop error and steady-state error and thereby producing a respective control signal, and one of said control signals being fed to said power supply and the other control signal being fed to said force means.

* * * * *

UNITED STATES PATENT AND TRADEMARK OFFICE
CERTIFICATE OF CORRECTION

| | | |
|---|---|---|
| PATENT NO. | : 6,036,796 | Page 1 of 1 |
| APPLICATION NO. | : 09/105820 | |
| DATED | : March 14, 2000 | |
| INVENTOR(S) | : Halbert et al. | |

It is certified that error appears in the above-identified patent and that said Letters Patent is hereby corrected as shown below:

Col. 9, Line 18
 replace "claim 10"
 with --claim 9--

Signed and Sealed this

Seventeenth Day of July, 2007

JON W. DUDAS
*Director of the United States Patent and Trademark Office*